United States Patent [19]

Flemming

[11] 4,216,962
[45] Aug. 12, 1980

[54] BOOMERANG

[76] Inventor: Stephen J. Flemming, 3312 S. Center Rd., Burton, Mich. 48519

[21] Appl. No.: 868,992

[22] Filed: Jan. 12, 1978

[51] Int. Cl.² ............................................. A63B 65/08
[52] U.S. Cl. ...................................... 273/426; 46/28; 403/165; 403/252
[58] Field of Search ................ 273/106 D; 46/28, 25; 403/165, 252; 24/216, 217 R, 208 A

[56] References Cited

U.S. PATENT DOCUMENTS

| 636,148 | 10/1899 | Kenyon | 403/165 X |
|---|---|---|---|
| 692,608 | 2/1902 | Bristow | 273/106 D |
| 917,349 | 4/1909 | Opsal | 403/165 X |
| 1,368,176 | 2/1921 | McMillan | 273/106 D X |
| 2,616,142 | 11/1952 | Tinnerman | 24/217 |
| 2,709,290 | 5/1955 | Rosenthal | 24/216 X |
| 2,972,833 | 2/1961 | Grutta | 46/28 X |
| 3,210,883 | 10/1965 | Ulsh | 24/217 X |
| 3,251,109 | 5/1966 | Wilson et al. | 24/216 |
| 3,286,391 | 11/1966 | Mengeringhausen | 24/217 X |
| 3,403,910 | 10/1968 | Claycomb | 273/106 D |
| 3,461,514 | 8/1969 | Morris | 24/217 X |
| 3,493,990 | 2/1970 | Winn | 24/208 A UX |
| 3,643,296 | 2/1972 | Kahn | 24/217 X |
| 3,814,431 | 6/1974 | Callahan | 273/106 D |
| 3,955,817 | 5/1976 | Davis | 273/106 D |
| 3,979,119 | 9/1976 | Cecchetti | 46/25 X |

FOREIGN PATENT DOCUMENTS

| 268500 | 10/1963 | Australia | 24/208 A |
|---|---|---|---|
| 621404 | 4/1949 | United Kingdom | 24/208 A |

Primary Examiner—Paul E. Shapiro
Attorney, Agent, or Firm—John J. Swartz

[57] ABSTRACT

A boomerang comprising a pair of elongate, airfoils coupled together at their midsections to form a cross. Mechanism is provided for releasably coupling the midportions of the airfoils for separation under a predetermined force to normally prevent relative rotation of the airfoils.

17 Claims, 13 Drawing Figures

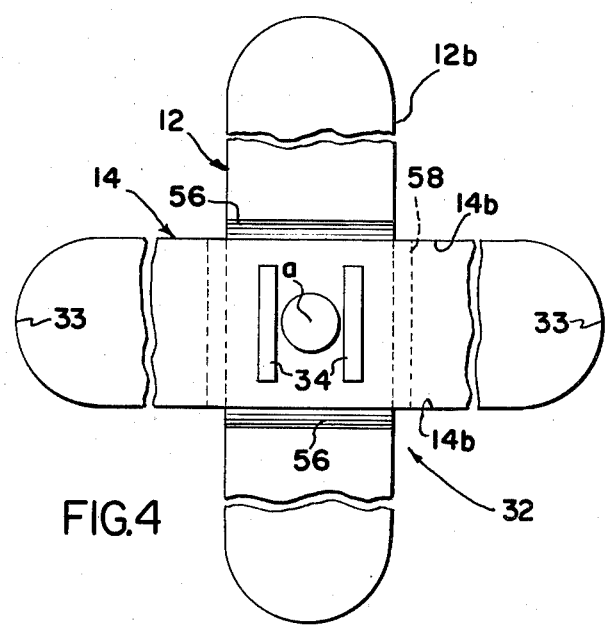
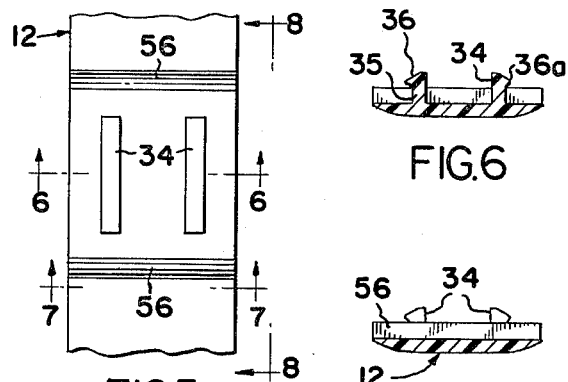
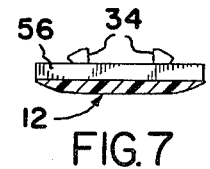
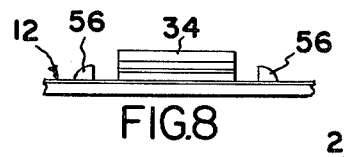
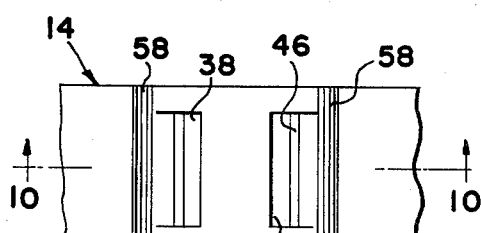
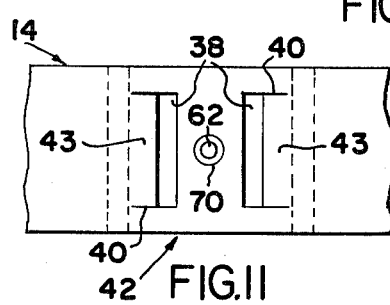
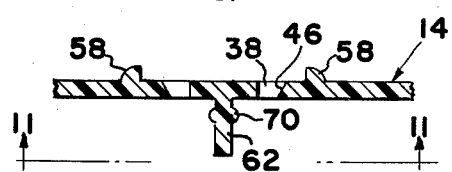
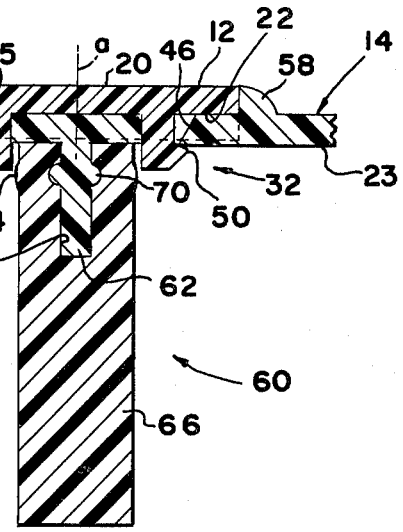

BOOMERANG

BACKGROUND OF INVENTION

This invention relates to a device which can be thrown through the air and is aerodynamically configured so as to return near the starting point, and more particularly, to a boomerang including angularly related airfoils detachably coupled together.

One typical boomerang comprises an elbow shaped, one piece throwing club. The versatility and efficacy of this prior art boomerang is limited. This prior art boomerang is also relatively expensive to manufacture. Accordingly, it is an object of the present invention to provide a new and novel boomerang which is versatile and has new and novel aerodynamic characteristics.

It is an object of the present invention to provide a new and novel boomerang comprising a pair of elongate airfoils angularly coupled to form a cross.

It is another object of the present invention to provide a boomerang in the shape of a cross having a plurality of circumferentially spaced airfoils which spin when propelled through the air, about a predetermined axis.

It is another object of the present invention to provide a new and novel boomerang comprising a pair of individual, transversely related, elongate airfoils and mechanism for releasably coupling the hub portions of the airfoils.

Still another object of the present invention is to provide a boomerang comprising a pair of elongate airfoils rotatable about an axis when propelled through the air and mechanism which will preclude relative spinning motion thereof during normal operation, but which will permit separation thereof upon being subjected to a predetermined impact.

Yet another object of the present invention is to provide a boomerang of the type described including upper and lower surfaces having a new and novel aerodynamic configuration.

A still further object of the present invention is to provide a boomerang which is aerodynamically configured to exhibit a plurality of new and novel flight patterns depending upon the manner in which it is thrown.

When the boomerang, constructed according to the present invention, is properly thrown in a forward path and concurrently rotated about a rotational axis, it will return to the starting point. The boomerang can be stopped in flight by the sender manually grasping the spinning airfoils. To assist the user, the boomerang, constructed according to the present invention, includes a handle lying on and being rotatable about the rotational axis of the boomerang.

Still another object of the present invention is to provide boomerang apparatus of the type described which is sturdy but includes detachable airfoils which will separate under a predetermined impact without breaking.

It is another object of the present invention to provide a boomerang having detachable airfoils which can be easily disassembled for storage and shipping.

Other objects and advantages of the present invention will become apparent to those of ordinary skill in the art as the description thereof proceeds.

SUMMARY OF THE INVENTION

A boomerang comprising a plurality of circumferentially disposed, radially outwardly extending airfoil blades having radially inner hub portions and radially outer terminal end portions extending radially outwardly away from a rotational axis; hub coupling mechanism for detachably coupling the radially inner hub portions together for separation upon being subjected to a predetermined force; the blades being aerodynamically configured so that when propelled through air away from a starting location and concurrently rotated about the rotational axis said boomerang will travel in such a path as to return to the starting location from which thrown.

The present invention may more readily be understood by reference to the accompanying drawings in which:

FIG. 4 is a greatly enlarged top plan view, primarily illustrating the hub portion of the boomerang, parts of the airfoils being broken away;

FIG. 5 is a bottom plan view of the hub portion of the uppermost airfoil only;

FIG. 6 is a sectional end view of the uppermost foil, taken along the lines 6—6 of FIG. 5;

FIG. 7 is a sectional end view, taken along the line 7—7 of FIG. 5, illustrating the side projections for inhibiting relative rotation of the airfoils;

FIG. 8 is a side elevational view of the uppermost airfoil, taken along the line 8—8 of FIG. 5;

FIG. 8A is a sectional end view, taken along the line 8A—8A of FIG. 1;

FIG. 9 is a top plan view illustrating the hub portion of the underlying airfoil;

FIG. 10 is a sectional side view of the lowermost airfoil, taken along the line 10—10 of FIG. 9;

FIG. 11 is a bottom plan view of the underlying foil, taken along the line 11—11 of FIG. 10; and FIG. 12 is a sectional end view, taken along the line 12—12 of FIG. 1; illustrating the airfoils in assembled relation.

DESCRIPTION OF THE PREFERRED EMBODIMENT

Figure 1:
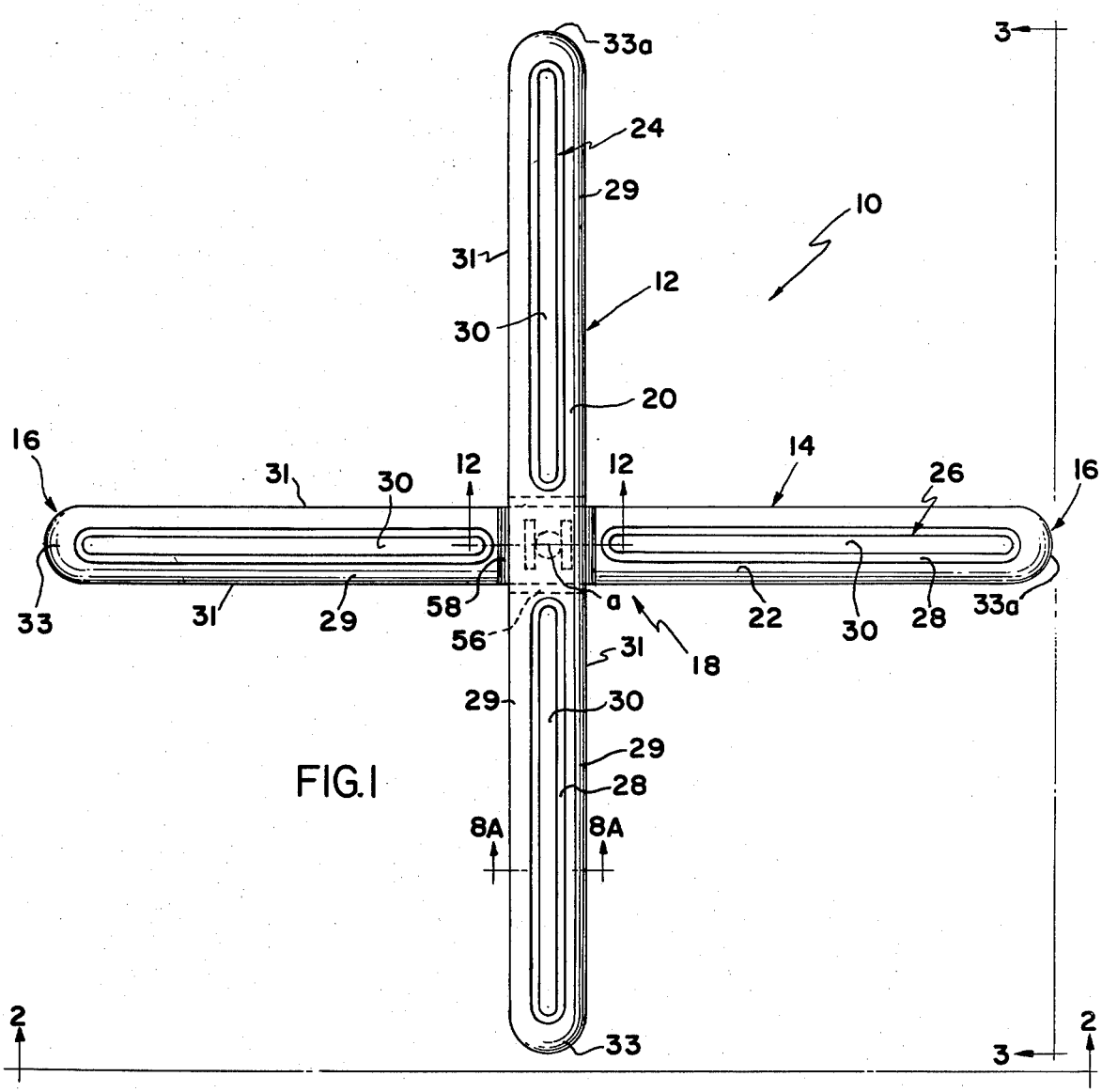
FIG. 1 is a top plan view of a boomerang constructed according to the present invention.
Figure 2:
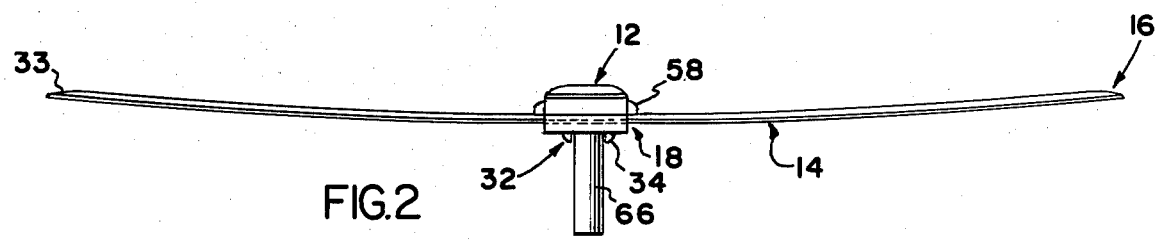
FIG. 2 is an end elevational view, taken along the line 2—2 of FIG. 1.
Figure 3:
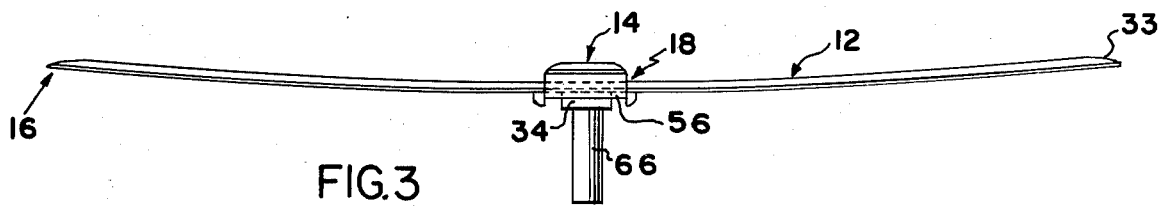
FIG. 3 is a side elevational view, taken along the line 3—3 of FIG. 1.

A boomerang constructed according to the present invention, generally designated 10, includes a pair of elongate, right angularly disposed, airfoils or blades 12 and 14. The aerodynamic characteristics of the airfoils 12 and 14 are such that when the boomerang 10 is propelled through the air and concurrently rotated about an axis a, the boomerang will return to the starting location from which it was thrown. As illustrated in FIGS. 2 and 3, each of the airfoils 12 and 14 is longitudinally curvilinear and bowed downwardly with the ends 16 being disposed at a level slightly above the midportions 18 to provide desired flight characteristics which aid the boomerang in returning to the person throwing the boomerang. The airfoils 12 and 14 include uninterrupted lower surfaces 23. To achieve desired flight characteristics, the convex upper surfaces 20 and 22 of airfoils 12 and 14 are interrupted and include elongate concave recesses, generally designated 24 and 26, having inwardly beveled side portions 28 and a generally planar central portion 30. The laterally outer edge portions 29 of the airfoils 12, 14 outwardly of the recesses 24, 26, are beveled downwardly and join the bottom surfaces 21 and 23 at sharp edges 31. The radially outer ends 33 of the upper surface are tapered downwardly and terminate in semi-circular edges 33a as illustrated in FIGS. 1, 2, and 3.

The radially inner hub portions 42 of airfoils 12 and 14 are detachably coupled together via a releasable locking or clamping apparatus, generally designated 32, which normally precludes relative rotation of the airfoils 12 and 14 about the axis a and normally precludes separation thereof unless subjected to a predetermined separating force. The locking apparatus 32 includes a pair of elongate locking projections or tabs 34, integral with the upper blade 12, including reduced neck portions 35 mounting integral, enlarged head portions 36 having offset retaining lip portions 36a. Complemental openings 38 are provided in the lowermost airfoil 14 for receiving the tabs 34. The lowermost airfoil 14 includes slits 40 along opposite sides of the apertures 38 and projecting longitudinally on opposite side of a hub portion 42. The slits 40 permit the airfoil portion 43 adjacent openings 38 to yield downwardly out of the plane of the hub portion 42, in the direction of the arrow 44, when the enlarged heads 36 pass through the apertures 38 during assembly. The yieldable hub portions 43 include inclined faces 46 which are complemental to the shape of beveled faces 48 provided on the retaining lip portions 36a, terminating in terminal edges 50. After the enlarged heads 36 pass the terminal edges 50 of the portions 43, the portions 43 escape past the edges 50 to the positions illustrated in FIG. 12. The locking tabs 34 prevent axial separation of the hub portions 42 unless subjected to a predetermined separating force and also serve to prevent relative rotation of the airfoils 12 and 14 while the boomerang is in flight.

The uppermost airfoil 12 includes a pair of longitudinally extending, integral projections 56 which abut laterally opposite sides 14b of the lowermost airfoil 14. The foil 14 similarly includes longitudinal projections 58 which abut laterally opposite sides 12b of the airfoil 12. The projections 56 and 58 assist the locking tabs 34 in preventing relative rotation of the airfoils 12 and 14 relative to each other about the rotational axis a. As previously described, the aerodynamic characteristics of the airfoils 12 and 14 are such that when the boomerang 10 is propelled in a direction away from a predetermined point and concurrently rotated about the rotational axis a, the boomerang 10 will travel in such a path as to return to its starting position or adjacent thereto. Depending on the method thrown, the boomerang 10 may assume many different flight patterns. For example, the boomerang 10 may first move forwardly, thence rearwardly to a position behind the starting position behind the starting point and thence forwardly to the starting point. The device will sometimes rise and fall during its flight path.

A handle, generally designated 60, is provided for manually grasping the boomerang on the return flight and includes shaft 62, integral with the lowermost airfoil 14. The shaft 62 includes an enlarged annular projection 64. The handle 60 comprises a cylindrical roller 66 having a cylindrical aperture 68 in one end thereof snugly receiving the shaft 62. The handle roller 66 is held axially via the bulbous projection 70 which permits the handle roller 66 to rotate about the rotational axis a. The handle roller 66 can be quickly and easily separated from the shaft 62 by merely axially moving the handle roller 66.

THE OPERATION

When assembled, in the positions illustrated in FIG. 12, the user need merely grab the radially outer end of one of the circumferentially disposed blade ends 33. Depending on the manner in which the user throws the device, it will rotate clockwisely or counterclockwisely about the axis a. Depending upon whether the plane of the device is vertical or horizontal when thrown, the device will exhibit different flight characteristics causing it to soar or dive, but always returning to the user. Occasionally, the device will return in direction towards the user, passing over the starting location and going behind the thrower, but once again returning to the starting point. If the device strikes an immovable object, the projections 36 will, upon sufficient impact, escape through the openings 38 to prevent the device from being structurally damaged. The projections, or the locking mechanism 32, holds the parts in assembled relation under normal circumstances but yet permits quick breakdown for easy shipping and storage. Accordingly, the device includes a built-in safety feature to prevent breakage and injury in the event the airfoils should hit an immovable object with a predetermined force.

The handle roller 66 is also removable so that the user can throw the device underhanded and in other ways to achieve desired flight effects. The device can be used as a toy or plaything or as a competitive device. The device can be used by a single individual who catches the boomerang upon its return or two individuals can play "catch" with the boomerang 10, if desired.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. A boomerang comprising:
   a pair of individual, transversely related, elongate airfoil means configured, when bodily rotatably propelled forwardly through air away from a starting point to rotate about a rotational axis which is generally perpendicular to said airfoil means to travel in such a path as to generally reverse its forward path of travel and, while continuing to rotate, return to a position at or adjacent said starting point; and
   means detachably coupling the midportions of said airfoil means, interjacent the ends thereof, together for separation upon being subjected to a predetermined force,
   each of said airfoil means includes top and bottom surfaces; each of said top surfaces including elongate recesses therein commencing adjacent said midportion and terminating adjacent said ends.

2. The boomerang set forth in claim 1 wherein said means detachably coupling said midportions comprises locking bosses on at least one of said airfoil means extending generally normally to said one airfoil means on laterally opposite sides of the other of said airfoil means.

3. The boomerang set forth in claim 1 wherein each of said airfoil means includes elongate, longitudinally curvilinear airfoil strips including a generally smooth, uninterrupted, longitudinally curvilinear lower surface and an upper surface having beveled lateral side portions terminating at the lateral side edge portions of said lower surface; said upper surface including at least one elongate recess therein.

4. The boomerang set forth in claim 3 wherein said upper surface includes curvilinear, beveled end edge portions joining complementary curvilinear end edge portions of said lower surface.

5. The boomerang set forth in claim 1 wherein said pair of airfoil means comprise a pair of longitudinally curvilinear airfoils.

6. The boomerang set forth in claim 5 including a handle, extending along said axis, coupled to one of said airfoil means and extending generally perpendicular relative thereto.

7. The boomerang set forth in claim 6 including handle coupling means for releasably coupling said handle to said one airfoil means.

8. The boomerang set forth in claim 7 wherein said handle coupling means includes means mounting said handle for rotation relative to said airfoils about said rotational axis.

9. The boomerang set forth in claim 8 wherein said coupling means comprises projection means on said one airfoil means having enlarged portions intermediate the ends of said projection means; said handle being press fit on said projection means.

10. The boomerang set forth in claim 1 wherein said coupling means comprises yieldable locking projections means mounted on one of said airfoil means and extending generally perpendicular thereto yieldably releasably clutching said other of said airfoil means.

11. The boomerang set forth in claim 1 wherein said coupling means includes first projection means, mounted on one of said airfoil means and having a portion positioned adjacent the other of said airfoil means for inhibiting relative swinging movement of said airfoil means, and second projection means mounted on said one airfoil means and extending outwardly therefrom;

said second airfoil means including aperture means receiving said second projection means.

12. The boomerang set forth in claim 11 wherein said second projection means comprises a pair of projections each having an offset terminal portion; said second airfoil means including slits therein intersecting said aperture means permitting a portion of said second airfoil means adjacent said aperture means to yield and increase the effective size of said aperture means so as to permit said offset terminal portion to pass thereby.

13. The boomerang set forth in claim 1 wherein said airfoil means comprise relatively transversely disposed airfoils, said coupling means comprises locking projection means on one of said airfoils and expansible and contractible projection receiving aperture means in the other of said airfoils for receiving said locking projection means; said locking projection means including an offset portion overlying a portion of said second airfoil adjacent said aperture means.

14. The boomerang set forth in claim 13 wherein said projection means includes beveled end portions; said aperture means including a complementally beveled portion; said second airfoil including a pair of slits on laterally opposite sides of said complementally beveled portion permitting said complementally beveled portion to be moved out of the plane of the remainder of said second airfoil when said projection means is inserted into said aperture means to increase the effective size of said aperture means and permit said offset portion to pass thereby.

15. A boomerang comprising:

a pair of individual, transversely related, elongate airfoil means configured, when bodily rotatably propelled forwardly through air away from a starting point to rotate about a rotational axis which is generally perpendicular to said airfoil means, to travel in such a path as to generally reverse its forward path of travel and, while continuing to rotate, return to a position at or adjacent said starting point; and means detachably coupling the midportions of said airfoil means, interjacent the ends thereof, together for separation upon being subjected to a predetermined force;

each of said airfoil means includes elongate, longitudinally curvilinear airfoil strips including a generally smooth, uninterrupted, longitudinally curvilinear lower surface and an upper surface having beveled lateral side portions terminating at the lateral side edge portions of said lower surface; said upper surface including elongate recesses therein.

16. The boomerang set forth in claim 15 wherein said upper surface includes longitudinally curvilinear, laterally curvilinear, beveled end edge portions joining curvilinear end edge portions of said lower surface.

17. A boomerang comprising:

first and second elongate, longitudinally curvilinear, symmetrical airfoils each including opposed terminal ends, an intermediate midportion, a generally smooth, uninterrupted, longitudinally curvilinear lower surface, and a convex upper surface joined to said lower surface at lateral edges; and means for detachably coupling the midportions of said airfoils together for concurrent rotation, when propelled, about an axis transverse to said airfoils;

said airfoils having such aerodynamic characteristics that said airfoils, when bodily propelled through the air from a starting location and concurrently rotated about said axis, will follow a curvilinear path and generally return to said starting point;

said upper convex surfaces each including elongate, longitudinally extending concave recesses therein laterally between said lateral edges; said recesses commencing adjacent said midportions and terminating adjacent said terminal ends.

* * * * *